US007603377B2

(12) United States Patent
Awad et al.

(10) Patent No.: US 7,603,377 B2
(45) Date of Patent: Oct. 13, 2009

(54) METHOD AND DATA STRUCTURE FOR INDEXED STORAGE OF HIERARCHICALLY INTERRELATED INFORMATION IN A RELATIONAL DATABASE

(75) Inventors: Yasser Awad, Ottawa (CA); Ahmed Moustafa, Kanata (CA); Mohamad Hassoun, Ottawa (CA)

(73) Assignee: Alcatel Lucent, Paris (FR)

( * ) Notice: Subject to any disclaimer, the term of this patent is extended or adjusted under 35 U.S.C. 154(b) by 465 days.

(21) Appl. No.: 11/255,953

(22) Filed: Oct. 24, 2005

(65) Prior Publication Data

US 2006/0288020 A1 Dec. 21, 2006

(30) Foreign Application Priority Data

Jun. 15, 2005 (CA) .................................. 2509972

(51) Int. Cl.
*G06F 7/00* (2006.01)
*G06F 17/00* (2006.01)

(52) U.S. Cl. ..................... 707/102; 707/1; 707/103 R

(58) Field of Classification Search ............... 707/1, 707/100, 102, 103 R See application file for complete search history.

(56) References Cited

U.S. PATENT DOCUMENTS

| | | | |
|---|---|---|---|
| 5,467,471 A * | 11/1995 | Bader | 707/1 |
| 5,724,577 A | 3/1998 | Exley et al. | |
| 6,947,946 B2 * | 9/2005 | Nishikawa | 707/102 |
| 7,051,064 B1 * | 5/2006 | Yamagishi et al. | 709/200 |
| 7,191,182 B2 * | 3/2007 | Anonsen et al. | 707/100 |

OTHER PUBLICATIONS

Teuhola, Jukka, "Path Signatures: A Way to Speed Recursion in Relational Databases", vol. 8, Jun. 1996, pp. 446-454, XP002427306.
Tropashko, Vadim, "Trees in SQL: Nested Sets and Materialized Path", Apr. 13, 2005, XP002427307.
"Creating and Maintaining Hierarchies" Oracle Business Intelligence Discoverer Administration Guide, Part No. B13916-02, Chapter 13, Nov. 2004, pp. 1-18, XP002427322.
Meng, W., et al. "A Theory of Translation From Relational Queries to Hierarchial Queries", vol. 7, No. 2, Apr. 1, 1995, pp. 228-245, XP000541405.
Delobel, Claude, "Normalization and Hierarchical Dependencies in the Relational Data Model", vol. 3, No. 3, Sep. 1, 1978, pp. 201-222, XP000653885.
Cabibbo, Luca, et al. "Managing Inheritance Hierarchies in Object/Relational Mapping Tools", Jun. 13, 2005, pp. 135-150, XP 019009919.

* cited by examiner

*Primary Examiner*—Greta L Robinson
*Assistant Examiner*—Jeffrey Chang

(57) ABSTRACT

The invention addresses the problem of storing and maintaining highly hierarchical information in a relational database, relational databases which are more prevalent and enjoy strong database provider support. The efficacy of the storage and the maintenance of highly hierarchical information a relational database is aided by a record key uniquely ascribed to each database record across all database record tables in the relational database. Further the record key has a format which permits the specification of a "contains" relationship between database records. Beneficial information storage and information retrieval improvements are attained by using this, and only this, record key to index all database records in all record tables in the relational database.

20 Claims, 3 Drawing Sheets

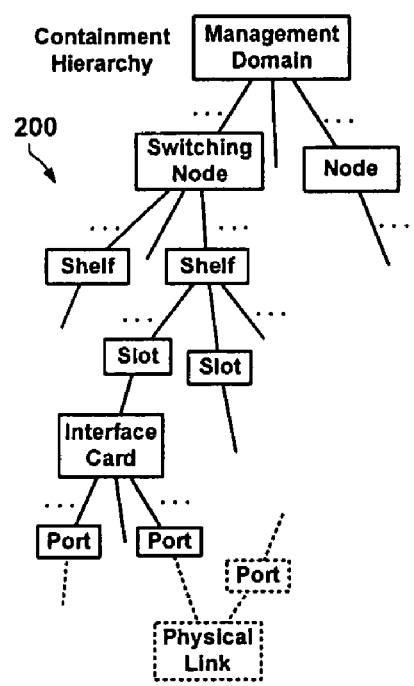
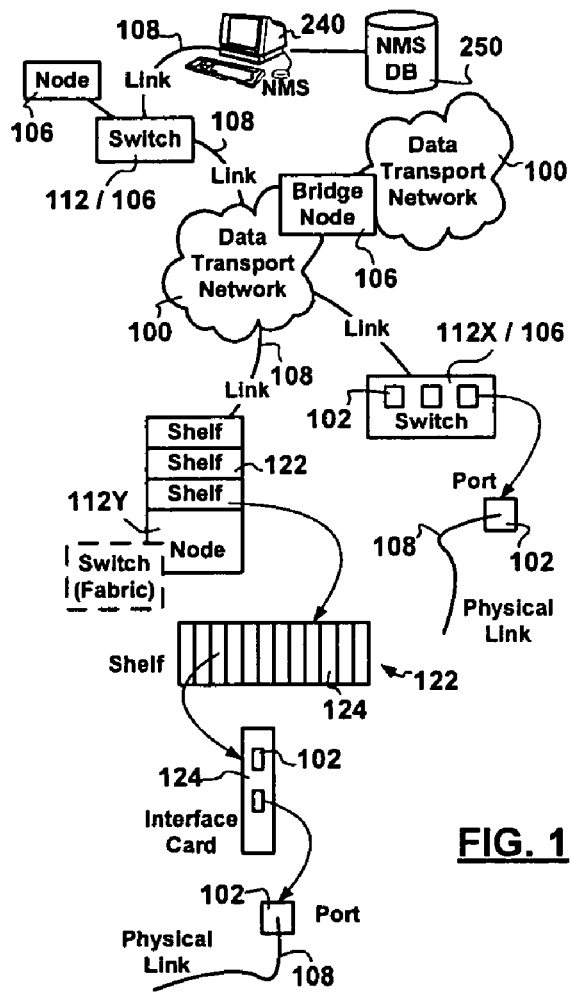
FIG. 3
FIG. 1

METHOD AND DATA STRUCTURE FOR INDEXED STORAGE OF HIERARCHICALLY INTERRELATED INFORMATION IN A RELATIONAL DATABASE

FIELD OF THE INVENTION

The invention relates to information storage in a relational database, and in particular to methods and data structures for storing information having deep hierarchical relationships in a relational database.

BACKGROUND OF THE INVENTION

Relational databases and means for storing information in relational databases are being used to store interrelated information and to provide the means for specifying relationships. Examples include service provisioning wherein customer records are kept—relevant relationships including: "address for service", "content subscribed to", "service level agreement parameters", "access window pricing scheme", "connectivity record", etc. While all such information can certainly be stored in a single super-record for each customer, when the service is subject to different offerings, the storage of super-records for all customers is inefficient when substantial fractions of customers either are not subject to content restrictions, are not subject service level agreements, or have flat fee access to the service. Relational database techniques provide the means for grouping the information tracked and for specifying interrelationships therebetween. The storage of address for service records, content subscription records, service level agreement parameter records, access window pricing scheme records, and connectivity records, in corresponding tables, employs primary and foreign record keys. Primary record keys are used for sorting records within the respective tables, and for retrieving records from the tables. Foreign keys are used to express the relationships between records in different tables. For example in generating bills for services, the address for service table is consulted for each customer between other things to obtain the customer identifier. Typically the customer identifier is the primary key used to store the address for service records themselves. Next, the access window pricing scheme table is searched based on the customer identifier to determine whether the subscriber has either an unlimited flat fee access, a flat fee time based access, or a time of day indexed fee schedule. Exemplary benefits of relational database storage techniques are apparent from the fact that the connectivity record does not store access records for unlimited flat fee customers.

Relational database use, as exemplary described above, is prevalent, storing much of the information found today on the World Wide Web.

It is apparent that in the above example a one-to-many relationship exists between database records in the address for service table and database records in the other tables. The first lookup in the address for service table obtaining the customer identifier (the foreign key being specified in all other tables), is known in the art as "table joining", and in this service provisioning example, a single table joining operation is performed. However not all information can be grouped in such a way that a single level one-to-many relationship exists between the tables employed.

FIG. 1 is a schematic diagram showing exemplary manageable entities implementing exemplary communication network infrastructure.

Manageable entities include communications network nodes 106, for example data switching nodes 112. A data network equipment vendor may chose to implement an integral data network node device 122X having a data switching processor operable to switch data between a group of ports 102, while another data network equipment vendor may chose a customizable implementation of a data switching node 112Y including: a switching fabric, an equipment rack divided into shelves 122, each shelf 122 having slot connectors for connection with interface cards 124, each interface card 124 having at least one port 102. Physical data transport links 108 interconnect ports 102 of data network nodes.

Although conceptually the two data switching nodes 112X and 112Y provide similar data switching functionality, each equipment implementation is adapted for a different environment: the former data switching node 112X is more adapted to enterprise solutions as a private data network node, perhaps further adapted to be connected to carrier networks 100; while the latter data switching node 112Y is better adapted for high data throughput in the core of public data transport networks 100. Typically the former 112X implements a small number of data transport protocols while for the latter 112Y, data transport protocols are implemented on interface cards 124 and/or ports 102—providing for a flexible/configurable deployment thereof. Without limiting the invention thereto, each interface card 124 and port 102 represents a manageable entity.

In employing currently known relational database storage techniques, the "contains" relationship can be used to store highly hierarchical information such as deployment information regarding manageable entities of a managed communications network. Tracking deployment information for a managed communications network is performed by a network management system 240 maintaining a relational database 250. Network management systems 240 require effective storage and retrieval of a large amount of such highly hierarchical information.

The above mentioned approach when applied to the storage of highly hierarchical information in a relational database 250 teaches to use the primary key to store dependent database records in respective record tables and the use of the foreign key to uniquely identify the corresponding parent database record within another record table, database record which "contains" the dependent record.

Assuming database record uniqueness (see below), the multi-level hierarchical relationships between the information stored in the relational database 250 necessitates a considerable number of table joining operations to be performed as described above, and in particular a number of table joining operations which grows with the depth at which database records sought reside. It is apparent that the techniques currently employed in storing information in relational databases 250 do not scale well for highly hierarchical information. Inevitably the poor scalability has a negative impact on relational database 250 deployment costs, operational costs, and maintenance costs. Furthermore, the poor scalability results in slower relational database access times which are, to say the least, undesirable as the managed communications network is experiencing a failure and particularly undesirable during network failure recovery.

Problems exist in employing current information modeling techniques to store highly hierarchical information in the relational database 250 when duplicate modeled entity identification is unavoidable, for example, while each port on an interface card has a unique Media Access Control ADDRess (MAC ADDR) and the interface card has a unique serial number, each respectively associated therewith during manufacture, slots of a shelf 122 and shelves 122 themselves do not have inherently unique identifiers. In accordance with current information modeling techniques, shelf slots have non-uniquely global identifiable database records corresponding thereto as each shelf 122 has a first slot. Similarly; the shelves 122, while physical constructs, do not have inherently unique identifiers either, each equipment rack of data switching nodes 112Y having a first shelf 122. Considering shelf slot database records, this creates a problem in that the foreign key is not unique, as a relationship expressed as "the first shelf slot of the first shelf 122" is not sufficiently unique. Aside from the table joining overhead mentioned above, employing relational databases with improved deployment, operational, and maintenance efficiencies is sought for storing highly hierarchical information about entities which cannot be inherently uniquely identified. This necessitates the extension of presently known relational database techniques to provide unique primary keys for inherently non-uniquely identifiable database records.

Extending current modeling techniques for storing highly hierarchical information in relational databases leads to the use of multiple keys for each database record, wherein a key is used for each level of the hierarchy having a "contains" relationship with the database record resulting in adding the full containment specification to each database record as shown in FIG. 2. For example, each port database record in the port record table includes an of-card key, an installed-in-slot key, an of-shelf key, an of-node key, etc. While the storing of multiple keys in dependent database records seems to provide a solution to the table joining problem, an overhead is added in that in order to eliminate table joining operations, the database records in each record table need to be sorted based on each key every time database records are added and/or deleted. The search of record tables is therefore slow. Further, specifying the full containment specifications in every database record is an inefficient use of database storage resources, and violates a data redundancy relational database data integrity rule which forbids repeated storage of the same key.

Another problem typically encountered in employing relational databases to store hierarchical information relates to the above described fact that not every communications network node 106 has shelves 122 and ports 102 in data switching nodes 112X are not physically associated with any interface cards 124. The modeling of the information therefore necessitates the storage of intermediary database records for virtual managed entities to adapt the relational database 250 to the physical reality. However intermediary database records by virtue of having to be stored in corresponding record tables take just as much storage space.

In view of the fact that using relational databases to store highly hierarchical information in accordance with current techniques suffers in terms of storage inefficiencies, and slow access and maintenance; there is a need to address the above mentioned issues.

SUMMARY OF THE INVENTION

In accordance with an aspect of the invention, a record table for storing highly hierarchical information in a relational database is provided. Relationships between database records associated with a multitude of hierarchical groups specify "contains" relationships between across groups. Each record table includes a group from the multitude of groups of database records, the group being associated with a level of a containment hierarchy. Each database record further includes: a data portion for storing information regarding a corresponding entity associated with the level of the containment hierarchy; and a record key for uniquely identifying the database record within the relational database. The record key has a format specifying at least one record key region. Each record key region is associated with a corresponding level of the containment hierarchy associated with a group in a "contained within" relationship with the database record. The record key value stored in each record key region indexes a specific database record in the record table corresponding to the level of the containment hierarchy.

In accordance with another aspect of the invention, a database record of a plurality of database records for storing highly hierarchical information in a relational database is provided. Relationships between database records associated with a multitude of hierarchical groups specify "contains" relationships across groups, each group of database records being stored in a record table associated with a level of a containment hierarchy. The database record includes: a data portion for storing information regarding a corresponding entity associated with the level of the containment hierarchy; and a record key for uniquely identifying the database record within the relational database. The record key has a format specifying at least one record key region. Each record key region is associated with a corresponding level of the containment hierarchy associated with a group in a "contained within" relationship with the database record. The record key value stored in each record key region indexes a specific database record in the record table corresponding to the level of the containment hierarchy.

In accordance with a further aspect of the invention, a method for storing highly hierarchical information in a multitude of database records in a relational database is provided. Relationships between database records associated with a plurality of hierarchical groups specifies "contains" relationships across groups. Database records of the same group are stored in a corresponding record table. And, a record key is ascribed to each database record for uniquely identifying the database record within the relational database. The record key has a format specifying at least one record key region, each record key region corresponding to a level of a containment hierarchy associated with a group in a "contained within" relationship with the database record. The record key value stored in each record key region indexes a specific database record of the group of database records corresponding to the level of the containment hierarchy.

In accordance with yet another aspect of the invention, a method for accessing highly hierarchical information stored in record tables of a relational database is provided. Each record table stores database records associated with a particular level of a containment hierarchy. Relationships between database records specify "contains" relationships across record tables. Identifying database records "contained" by a specified database record includes a sequence of steps. The value of a record key region of a record key of the specified database record is obtained. Each record key specifies an entire containment specification of the corresponding database record, the record key region being associated with the level of the containment hierarchy corresponding to the specified database record. The obtained value is set as a lower search bound. The value of the record key region of a record key ascribable to a next database record at the same level in the containment hierarchy as the specified database record is determined. The determined value is set as the upper search bound. And, a record table storing a plurality of database records "contained" by the specified database record is searched for database records having record keys between the lower search bound and the upper search bound.

The advantages are derived from a faster and less onerous access to database records, a more compact database record storage achieved by the elimination of redundant storage of keys, and the use of a key fully specifying containment reduces the need to maintain relationships between the tables.

BRIEF DESCRIPTION OF THE DRAWINGS

The features and advantages of the invention will become more apparent from the following detailed description of the exemplary embodiment(s) with reference to the attached diagrams wherein:

FIG. 1 is a schematic diagram showing data network elements implementing a connected data transport infrastructure;

FIG. 3 is a schematic diagram showing, in accordance with the exemplary embodiment of the invention, an exemplary containment hierarchy and exemplary unique database record keys maintained by a network management system;

Figure 2:
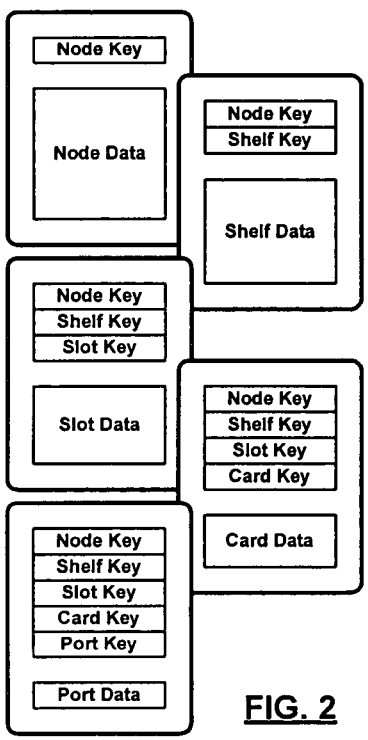
FIG. 2 is a schematic diagram showing database records having multiple keys corresponding to multiple layers of a containment hierarchy.

It will be noted that in the attached diagrams like features bear similar labels.

DETAILED DESCRIPTION OF THE EMBODIMENTS

In accordance with an exemplary embodiment of the invention, FIG. 3 depicts an excerpt of a containment hierarchy 200 stored in the relational database 250 maintained by NMS 240. In accordance with the exemplary embodiment of the invention, a single database record key 264 is used to specify full containment hierarchal relationships pertaining to each database record 262. Therefore, each database record 262 corresponding to a communication network managed entity has a record key 264 that is unique across all tables 260 in the relational database 250.

Without limiting the invention, in accordance with an exemplary implementation of the exemplary embodiment of the invention, all record keys 264 have the same representation within the same containment hierarchy 200. Without limiting the invention, each record key 264 has one of a string and a numeric representation.

Figure 4:
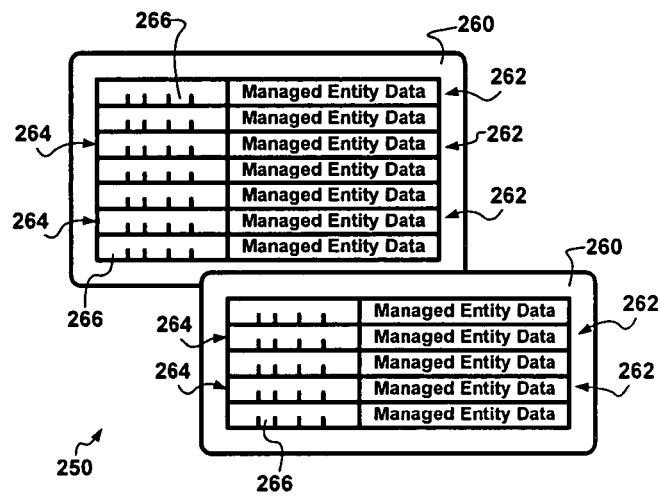
FIG. 4 is a schematic diagram showing, in accordance with the exemplary embodiment of the invention, relationships between record table, database record, record key and record key region data structures.

In accordance with the exemplary embodiment of the invention, making reference to FIG. 4, each record key 264 has a formatted representation divided into record key regions 266, each region corresponding to a level of the containment hierarchy. In accordance with an exemplary implementation of the exemplary embodiment of the invention, each record key 264 is an integer having a bit length, the format of the binary representation of which specifies bit allocations defining bit regions.

In accordance with the exemplary embodiment of the invention, the bit allocation of the record key regions is non-uniform. Design choice is to be exercised in modeling the information to be stored, for example the record key 262 is 32 bits long with 10 bits set aside for indexing a communication network node, 5 bits set aside for indexing a shelf, 5 bits for indexing a shelf slot, 5 for cards, and 7 for ports. This exemplary choice of bit allocations enable the tracking of information in the relational database 250 for a communications network having a maximum number of 1024 nodes 106, each node 106 having a maximum number of 32 shelves 122 with a maximum number of 32 slots per shelf 122, in which 32 cards 124 can be installed, each card 124 having 128 ports 102.

The value stored in each region 266 of the record key 264 of a given database record 262 specifies which database record 262, in another record table 260, "contains" the database record 262. Database records 262 associated with upper levels in the containment hierarchy 200 have record keys 264 which have zero values stored in regions 266 of the record keys 264 corresponding to lower levels in the containment hierarchy. The values stored in the region 266 of the record key 264 corresponding to a particular level in the containment hierarchy 200 are unique in the scope of unique values stored in regions 266 corresponding to upper levels of the containment hierarchy 200, and therefore record keys 264 are unique across all database records 262 stored in the relational database 250.

In accordance with the exemplary embodiment of the invention, using this mechanism, the record key 264 of a "contained" database record 262 will always have a greater numeric value than that of the record key 264 of the "containing" database record 262, but less than the value of the record key 264 of the next database record 262 "containing" similar "contained" database records 262.

In accordance with the exemplary embodiment of the invention, all database records 262 are indexed and all record tables 260 are sorted according to the record key 264.

Therefore, in accordance with the exemplary embodiment of the invention, each record table search is always performed only on a subgroup of database records 262 based on simple mathematical comparisons of record keys 264 which are also used for retrieving the database records 262. The searching of only a subgroup of database records 262 in a record table 260 for each database record access provides an increased search speed.

The use of integer record keys 262 ensures that each record table 260 is sorted only once as database records 262 are added to a record table 260 and/or as database records 262 are modified.

Figure 5:
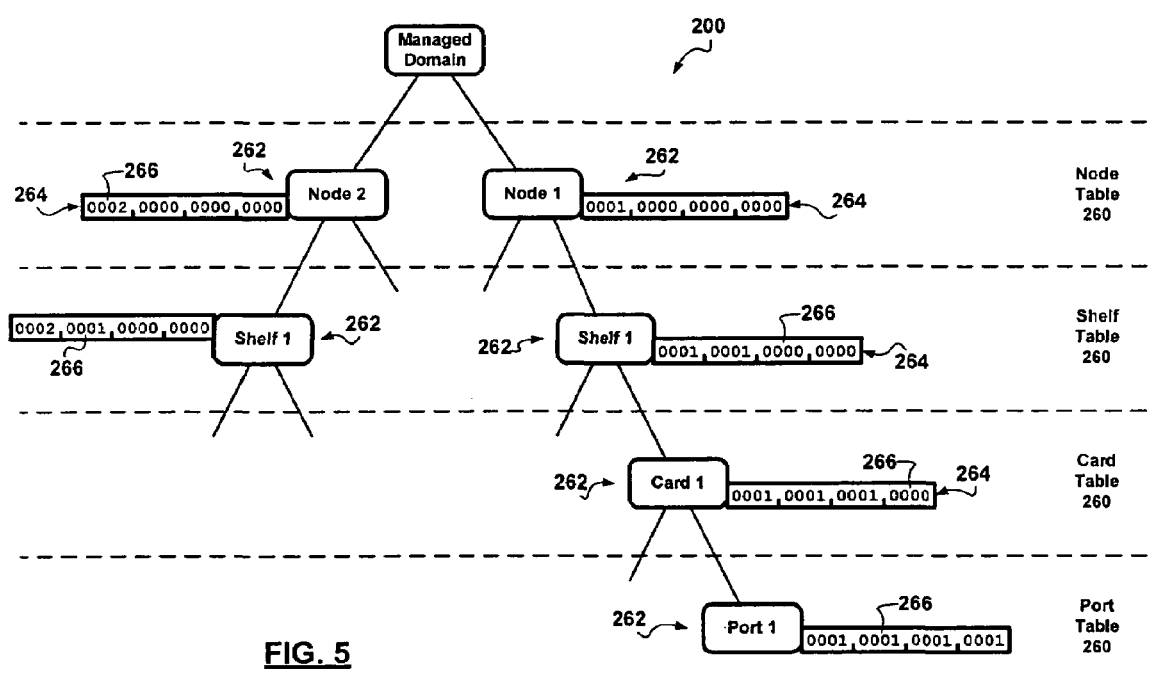
FIG. 5 is a schematic diagram showing an exemplary implementation of the exemplary embodiment of the invention.

FIG. 5 shows exemplary record keys 254 having 16-bit lengths with multiple regions 266 each 4 bits long, the shelf slot level in the hierarchy being omitted.

The record key 264 of communication network node 1 is assigned value 4096 having 0001 0000 0000 0000 as a binary representation, the record key 264 of shelf 1 of node 1 is assigned value 4352 having 0001 0001 0000 0000 as a binary representation, the record key 264 of card 1 installed in shelf 1 of node 1 is assigned value 4368 having 0001 0001 0001 0000 as a binary representation, etc. The record key 264 of communication network node 2 is assigned value 8192 having 0002 0000 0000 0000 as a binary representation, and so on. In order to identify cards 124 which belong to communications network node 1, a simple search is performed on the card record table 260 for database records 262 having record keys 264 greater than 4096, the numerical value of the record key 264 assigned to node 1 record key, and less than 8192, the numerical value of the record key 264 assigned to node 2. The scope of the node region 266 of node 1 extends between 4096 and 8192.

Deleting a database record 262 from the relational database 250 is simplified, because, in accordance with the exemplary embodiment of the invention, only database records 262 in each record table 260 having record keys 264 in the scope of the region 266 of the deleted database record 262 need to be accessed regardless of record table size.

The embodiments presented are exemplary only and persons skilled in the art would appreciate that variations to the above described embodiments may be made without departing from the spirit of the invention. The scope of the invention is solely defined by the appended claims.

We claim:

1. A record table of a plurality of record tables that store, in a relational database, relationships between database records associated with a plurality of hierarchical groups specifying "contains" relationships across groups comprising at least node, shelf, card, and port levels, each record table comprising:
   a group from the plurality of hierarchical groups of said database records, the group being associated with said node, shelf, card, and port levels of a containment hierarchy, each database record including:
      a data portion that stores information regarding a corresponding entity associated with said node, shelf, card, and port levels of the containment hierarchy; and
      a record key that uniquely identifies the database record within the entire relational database, the record key being an integer having a specified bit length and having a format specifying a plurality of record key regions, each record key region having a specified number of bits and being associated with said node, shelf, card, and port levels of the containment hierarchy associated with a group in a "contained within" relationship with the database record, the record key value stored in each record key region indexing a specific database record in the record table corresponding to said node, shelf, card, and port levels of the containment hierarchy.

2. The record table of claim 1, wherein the relational database is employed to store network management, information regarding a managed communications network, each database record corresponding to a manageable entity deployed in the communications network, the record key comprising a string, each record key region including a substring thereof.

3. The record table of claim 1, the record key having a common format across all database records, the format of the record key specifying a plurality of record key regions corresponding to said node, shelf, card, and port levels of said containment hierarchy.

4. The record table of claim 3, wherein the relational database is employed to store network management information regarding a managed communications network, each database record corresponding to a manageable entity deployed in the communications network, the record key comprising a number, each record key region including a plurality of bits corresponding to the binary representation thereof.

5. The record table of claim 4, wherein the record key comprises an integer.

6. A database record of a plurality of database records for storing, in a relational database, relationships between database records associated with a plurality of hierarchical groups specifying "contains" relationships across groups comprising at least node, shelf, card, and port levels each group of database records being stored in a record table associated with said node, shelf, card, and port levels of a containment hierarchy, the database record comprising:
   a data portion that stores information regarding a corresponding entity associated with said node, shelf, card, and port levels of the containment hierarchy; and
   a record key that uniquely identifies the database record within the entire relational database, the record key being an integer having a specified bit length and having a format specifying a plurality of record key regions, each record key region having a specified number of bits and being associated with said node, shelf, card, and port levels of the containment hierarchy associated with a group in a "contained within" relationship with the database record, the record key value stored in each record key region indexing a specific database record in the record table corresponding to said node, shelf, card, and Port levels of the containment hierarchy.

7. The database record of claim 6, wherein the relational database is employed to store network management information regarding a managed communications network, each database record corresponding to a manageable entity deployed in the communications network, the record key comprising a string, each record key region including a substring thereof.

8. The database record of claim 6, the record key having a common format across all database records, the format of the record key specifying a plurality of record key regions corresponding to said node, shelf, card, and port levels of said containment hierarchy.

9. The database record of claim 8, wherein the relational database is employed to store network management information regarding a managed communications network, each database record corresponding to a manageable entity deployed in the communications network, the record key comprising a number, each record key region including a plurality of bits corresponding to the binary representation thereof.

10. The database record of claim 9, wherein the record key comprises an integer.

11. A method for storing, in a plurality of database records in a relational database, relationships between database records associated with a plurality of hierarchical groups specifying "contains" relationships across groups comprising at least node, shelf, card, and port levels, the method comprising:
   storing database records of the same group in a corresponding record table; and
   assigning a record key to each database record for uniquely identifying the database record within the entire relational database, the record key being an integer having a specified bit length and having a format specifying a plurality of record key regions, each record key region having a specified number of bits and corresponding to said node, shelf, card, and port levels of a containment hierarchy associated with a group in a "contained within" relationship with the database record, the record key value stored in each record key region indexing a specific database record of the group of database records corresponding to said node, shelf, card, and port levels of the containment hierarchy.

12. The method of claim 11, wherein the relational database is employed to store network management information regarding a managed communications network, each database record corresponding to a manageable entity deployed in the communications network, wherein ascribing the record key to each database record, the method comprises
   ascribing a unique string, to the database record, each record key region including a substring thereof.

13. The method of claim 11, wherein ascribing the record key to each database record, the method comprises
   ascribing a record key having a common format across all database records, the format of the record key specifying a plurality of record key regions corresponding to said node, shelf, card, and port levels of said containment hierarchy.

14. The method of claim 13, wherein the relational database is employed to store network management information regarding a managed communications network, each database record corresponding to a manageable entity deployed in the communications network, wherein ascribing the record key to each database record, the method comprises ascribing a unique integer to the database record, each record key region including a plurality of bits corresponding to the binary representation thereof.

15. The method of claim 14, wherein ascribing the unique integer to the database record, the method comprises
ascribing an integer larger than the integer ascribed to the "database record containing" the database record and lower than the integer ascribable to next "database record containing" database records associated with the same of said node, shelf, card, and port levels in the containment hierarchy.

16. The method of claim 11, further comprising
a step of storing in a data portion of the database record information regarding a corresponding entity associated with said node, shelf, card, and port levels of the containment hierarchy.

17. The method of claim 11, further comprising
a subsequent step of sorting the plurality of database records stored in each record table based on the record key.

18. The record table of claim 1, said record table having a non-uniform allocation of bits across said node, shelf, card, and port levels of said containment hierarchy.

19. The database record of claim 6, said database record having a non-uniform allocation of bits across said node, shelf, card, and port levels of said containment hierarchy.

20. The method of claim 11, said method having a non-uniform allocation of bits across said node, shelf, card, and port levels of said containment hierarchy.

* * * * *